(12) United States Patent
Potanin

(10) Patent No.: US 7,806,942 B2
(45) Date of Patent: Oct. 5, 2010

(54) METHOD FOR PRODUCTION OF SECONDARY SOLID STATE CURRENT SOURCE

(75) Inventor: Aleksander Arkadievich Potanin, Sarov (RU)

(73) Assignee: The Potanin Institute Limited, Dublin (IE)

( * ) Notice: Subject to any disclaimer, the term of this patent is extended or adjusted under 35 U.S.C. 154(b) by 402 days.

(21) Appl. No.: 11/875,947

(22) Filed: Oct. 21, 2007

(65) Prior Publication Data

US 2008/0034579 A1 Feb. 14, 2008

Related U.S. Application Data

(63) Continuation of application No. PCT/RU2006/000197, filed on Apr. 19, 2006.

(30) Foreign Application Priority Data

Apr. 21, 2005 (RU) .............................. 2005111721

(51) Int. Cl.
*H01M 10/40* (2006.01)
*H01M 6/18* (2006.01)

(52) U.S. Cl. .................... 29/623.5; 29/623.1

(58) Field of Classification Search .................. None
See application file for complete search history.

(56) References Cited

U.S. PATENT DOCUMENTS

| 4,216,279 | A | 8/1980 | Mellors |
| 6,379,841 | B1 | 4/2002 | Potanin et al. |
| 2008/0034579 | A1* | 2/2008 | Potanin ................ 29/623.5 |

FOREIGN PATENT DOCUMENTS

| EP | 0915526 A2 | 5/1999 |
| GB | 1524126 | 5/1976 |
| RU | 1804252 C | 2/1995 |
| RU | 2136083 C1 | 8/1999 |
| RU | 1106382 A1 | 10/1999 |

OTHER PUBLICATIONS

International Search Report, mailed August 24, 2006, from International Application No. PCT/RU2006/000197, filed Apr. 19, 2006.
English translation of International Preliminary Report on Patentability, mailed Feb. 7, 2008, from International Application No. PCT/RU2006/000197, filed Apr. 19, 2006.
International Preliminary Report on Patentability from International application No. PCT/RU2006/000197, filed on Apr. 19, 2006, mailed Nov. 1, 2007.

* cited by examiner

*Primary Examiner*—John S Maples
(74) *Attorney, Agent, or Firm*—Houston Eliseeva LLP

(57) ABSTRACT

Application: in Electric Equipment, Specifically Production of Secondary Solid-State current sources (storage batteries). Nature of the invention: A method for production of a secondary solid-state current source through coating of both sides of solid electrolyte with anodic and cathodic materials with subsequent firing/baking and thermoelectric influence during transmission of electric current and polarization on electrodes below the voltage of electrolyte decomposition, at that both sides of electrolyte are coated with anodic and cathodic electrodes in a form of materials whose composition corresponds to composition of anodic and cathodic materials of completely discharged current source and thermoelectric influence is conduced with alternating current. Technical result: method for production of secondary solid-state current source allows to retain chemical composition of anodic and cathodic materials during firing/baking and to increase quality of agglomeration of anodic, cathodic and electrolytic materials and separation boarders of anode/electrolyte and electrolyte/cathode of the solid-state current source.

4 Claims, No Drawings

METHOD FOR PRODUCTION OF SECONDARY SOLID STATE CURRENT SOURCE

RELATED APPLICATIONS

This application is a Continuation of PCT application serial number PCT/RU2006/000197 filed on Apr. 19, 2006, which in turn claims priority to Russian application serial number 2005111721 filed on Apr. 21, 2005 both of which are incorporated herein by reference in their entirety.

BACKGROUND OF THE INVENTION

The invention relates to electrotechnology area, and in particular, to production of secondary solid-state current sources (storage batteries).

The invention proposes the method for production of safe solid-state batteries with high energy capacity and includes the following steps:

Ensuring contact between a current collector, a solid anode, a solid electrolyte, a solid cathode, and one more current collector in the mentioned order. At that, the reversible solid-phase fluorination/defluorination processes occur at both the cathode and the anode, and the electrolyte has the high fluoride-ion conductivity along with the low electronic conductivity in the solid phase.

Baking a current source consisting of the current collector, the anode, the electrolyte, the cathode and the current collector by means of baking and thermoelectric influence.

According to the present invention, "the current source" is both a separate galvanic cell consisting of the current collector, the anode, the electrolyte, the cathode and the other current collector, connected in the mentioned order and a battery, consisting of several galvanic cells, connected in parallel or in series.

In their composition anode, electrolyte, and cathode in the presented method of production of solid-state secondary current source with high specific energy capacity can correspond to composition of the current source from application RF Patent No 2005111722, issued on 21 Apr. 2005, wherein The anode is a metal (or its alloy) selected from the group consisting of Li, K, Na, Sr, Ba, Ca, Mg, Al, Ce, La or their alloys, or from the alloys of the listed metals with the metals, selected from the group of Pb, Cu, Bi, Cd, Zn, Co, Ni, Cr, Sn, Sb, Fe; and in the charged state the anode consists of the fluorides of the aforementioned metals, correspondingly.

In the charged state the cathode is made from the simple fluorides, such as $MnF_2$, $MnF_3$, $TaF_5$, $NdF_5$, $VF_3$, $VF_5$, $CuF$, $CuF_2$, $AgF$, $AgF_2$, $BiF_3$, $PbF_2$, $PbF_4$, $CdF_2$, $ZnF_2$, $CoF_2$, $CoF_3$, $NiF_2$, $CrF_2$, $CrF_3$, $CrF_5$, $GaF_3$, $InF_2$, $InF_3$, $GeF_2$, $SnF_2$, $SnF_4$, $SbF_3$, $MoF_5$, $WF_5$, fluorinated black lead or the alloys based on them, or their mixtures; and in the discharged state it can be made from the metal selected from the group of Mn, Ta, Nd, VF, Cu, Ag, Bi, Pb, Cd, Zn, Co, Ni, Cr, Ga, In, Ge, Sn, Sb, Mo, W, black lead, or the listed metal alloys, or the mixture.

The solid-state electrolyte can be made from either the fluorides of La, Ce or the compound fluorides based on them together with an alloying additives, such as fluoride/fluorides of alkaline-earth metals ($CaF_2$, $SrF_2$, $BaF_2$) and/or fluorides of alkaline metals (LiF, KF, NaF) and/or alkaline metal chlorides (LiCl, KCl, NaCl); or the compound fluorides based on the alkaline-earth metal fluorides ($CaF_2$, $SrF_2$, $BaF_2$) with an alloying additives of the rare-earth metal fluorides or/and the alkaline metal fluorides (LiF, KF, NaF); and (or) the chlorides of alkaline metals (LiCl, KCl, NaCl); or the compound fluorides based on $PbF_2$ containing $SrF_2$, or $BaF_2$, or $CaF_2$, or $SnF_2$ along with KF additive; or the compound fluorides based on $BiF_3$ containing $SrF_2$, or $BaF_2$, or $CaF_2$, or $SnF_2$ along with KF additive; and the anode, the electrolyte and the cathode contain component or components that prevent destruction of a solid-state battery during charge/discharge cycles.

RF Patent No 2136083, H01M6/18 (Informational Bulletin No 24, 1999) discloses the method for production of solid-state fluoride ion galvanic cells in the form of the multilayer structures using the technique of layer-by-layer pressing of the powders of the anodic, cathodic and electrolyte materials.

The drawback of the given method is that by using original solid ionic conductors with sufficiently high level of conductivity, resistance inside the produced current sources increases 100 and more times compare to resistance of the solid ionic conductors materials. This is associated with very high resistance at the particles' interface of the pressed structures (in particular of the electrolyte material) consisting of the powders of the solid-state ionic conductors. This is the widely known data for the polycrystalline structures made from the powders of the ionic conductors using pressing method (A. K. Ivanov-Shitz, I. V. Murin//Ionica of solid state, v.1., St. Petersburg University, 2000, pp 73-74).

At that, both the anode/electrolyte and the cathode/electrolyte interfaces have the high resistance, too. These resistances substantially determine the high internal resistance of the solid-state current sources produced by this technique. In that case the discharge power of the current sources at 25 C is measured in microwatts. This fact essentially limits the application area of the batteries.

The method, which is the closest to this invention, is disclosed in RF Patent No 1106382, H01M 6/18, issued on 10 Oct. 1999. According to the method the chemical battery is made by coating both sides of solid electrolyte with electrode pastes that have different polarity. Then, the stack is burned under the thermoelectric influence of electric current passing through the electrodes with the voltage that does not exceed the destruction potential of the electrolyte.

The known method of producing the solid-state battery has the following disadvantages:

Coating both sides of solid electrolyte with electrode pastes that have different polarity (anode and cathode) does not allow production of high quality current sources usually because of high chemical activity of anode material. This leads to changes in chemical composition of electrodes that consequently leads to lower quality of production and degradation of characteristics of the current source, specifically increase in internal resistance of the current source, especially during baking at high temperatures.

The method is complex enough because of the special requirements to the battery baking which should be carried out in the inert atmosphere that meets the strict requirements with respect to the content of oxygen, nitrogen and moisture in order to prevent contamination of the electrode materials.

The battery thermoelectric treatment by direct current leads to the sintering of the electrode materials and the electrolyte along with the change in the chemical composition of the electrode materials. As a result, the battery quality deteriorates, and the internal resistance grows.

SUMMARY OF THE INVENTION

The object of the present invention is to provide a technically attractive method for manufacturing the secondary solid-state current source allowing to improve the production quality and to decrease the battery internal resistance.

It is significant, that the problems concerned with the achievement of low internal resistance in the course of manufacturing a solid state current source are important today. Solid-state current sources that are based on solid super-ionic conductors usually have high internal resistance due to low ionic conductivity of solid ionic conductors and very high sensitivity of ionic conductivity to contamination of solid ionic conductors. This circumstance limits the area of applications and the development of solid-state current sources and a solution to lowering internal resistance has an important practical significance.

The achievable technical result of the present invention is the following:

1. Retention of the chemistry of the anode and cathode during the baking;
2. Retention of the chemistry of the anode and cathode during the thermoelectric treatment.
3. Decrease of the battery internal resistance by upgrading the sintering of the anode, the cathode, and the electrolyte materials as well as the interfaces of the anode/electrolyte and the electrolyte/cathode.

DETAILED DESCRIPTION OF THE PREFERRED EMBODIMENTS

In order to accomplish the above-stated tasks and technical result the method for manufacturing a secondary solid-state current source by means of applying of the anodic and cathodic materials on the both sides of the solid-state electrolyte along with the subsequent baking and thermoelectric treatment under electric current with the electrodes' polarization potential lower than a decomposition potential of the electrolyte is suggested. At that, according to the invention the chemistry of the anode and cathode is the same as a composition of the anodic and cathodic materials in a fully discharged current source, and the thermoelectric effect is carried out by alternating current.

In the proposed method of production solid state current source according to the invention:

1. During application on both sides of electrolyte of anodic and cathodic electrodes in the form of materials with low chemical activity, corresponding to anodic and cathodic materials of a fully discharged current source, retention of chemical composition of anodic and cathodic materials during baking is ensured, this consequently ensures production quality increase and does not lead to increase in internal resistance of the current source.

2. During execution of thermoelectric treatment using alternating electrical current, the chemical composition of anodic and cathodic electrodes does not change. Quality of baking of anodic, cathodic and electrolytic materials is improved along with improvement of quality of baking of the anode/electrolyte and electrolyte/cathode boundaries in solid-state current sources. During alternating electrical current, alternating temperature increase is observed in those localities of the current source, that have the highest resistance, this leads to intense sintering of these areas and decrease in resistance, which, at the end, is important for lowering resistance of a current source as a whole. Recurring heating of these areas is also important for the flow of mechanical relaxation processes, which take place during baking, that increase production quality during baking.

The thermoelectric influence can be effectively realized by alternating current of different polarity, or by sinusoidal alternating current, or by sinusoidal alternating current of industrial frequency. Use of sinusoidal alternating current of industrial frequency is the most attractive for the industrial production of the secondary solid-state battery in the frame of the present method.

According to the claimed method the thermoelectric influence can be carried out at the baking temperature and under the other conditions; simultaneously with baking or as an additional process, resulting in achievement of the formulated tasks and technological result.

A version of invention implementation

The industrial adaptability of the claimed method was determined experimentally. The $LaF_3$-containing anode and the Ag-containing cathode were applied on the solid electrolyte of tysonite structure. The following baking at 800° C. along with the thermoelectric treatment by sinusoidal alternating current of industrial frequency allowed to produce a structure with low internal resistance. As a result, the current source with the OCV of 3.7 V had the stable discharge parameters at the discharge voltage up to 1.5 V under the subsequent charge/discharge cycles.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

What is claimed is:

1. A method of manufacturing a secondary solid state current source comprising the steps of:
   applying anodic material on one side of a solid electrolyte to form an anode and applying cathodic material on another side of the solid electrolyte to form a cathode
   roasting the anode and the cathode and thermoelectrically acting on the anode and the cathode with an alternating current at such a polarization of the anode and the cathode which is lower than a decomposition voltage of the solid electrolyte;
   wherein the anodic material and the cathodic material have compositions corresponding to the compositions of the anodic material and the cathodic materials of a fully discharged current source.

2. The method according to claim 1, wherein thermoelectrically acting on the anode and the cathode with an alternating current comprises the alternating electric of different polarity.

3. The method according to claim 2, wherein thermoelectrically acting on the anode and the cathode with an alternating current comprises the alternating electric current of a sinusoidal form.

4. The method according to claim 3, wherein thermoelectrically acting on the anode and the cathode with an alternating current comprises the alternating electric of the sinusoidal form of an industrial frequency.

* * * * *